United States Patent [19]

Meiller

[11] Patent Number: 5,279,490
[45] Date of Patent: Jan. 18, 1994

[54] SUPPORT STRUCTURE FOR A SEAT

[75] Inventor: Hermann Meiller, Amberg, Fed. Rep. of Germany

[73] Assignee: Grammer AG, Amberg, Fed. Rep. of Germany

[21] Appl. No.: 976,538

[22] Filed: Nov. 16, 1992

[30] Foreign Application Priority Data

Apr. 3, 1992 [DE] Fed. Rep. of Germany ....... 4211095

[51] Int. Cl.$^5$ ............................................. F16M 13/00
[52] U.S. Cl. ........................................ 248/588; 248/421
[58] Field of Search ............... 248/421, 157, 423, 588, 248/406.2; 286/65.1, 63; 297/18; 254/122

[56] References Cited

U.S. PATENT DOCUMENTS

| | | | |
|---|---|---|---|
| 3,112,953 | 12/1963 | Raver | 297/18 |
| 3,822,913 | 7/1974 | Raver | 297/18 |
| 4,125,242 | 11/1978 | Meiller et al. | 248/421 X |
| 4,151,973 | 5/1979 | Sedlock | 248/421 X |
| 5,058,852 | 10/1991 | Meier | 248/588 |

FOREIGN PATENT DOCUMENTS 7427068  8/1974  France ................. 254/122

*Primary Examiner*—Ramón O. Ramirez
*Attorney, Agent, or Firm*—Elliot M. Olstein; Raymond J. Lillie

[57] ABSTRACT

A support structure for a seat squab includes a scissor support assembly on a base element. The support assembly has two support assembly elements which are not positively connected together but simply bear against each other. One element has one end connected to a suspension spring and its other end pivotably mounted to the base element. The second support assembly element comprises first and second limb portions which are connected together by means of a connecting portion which bears loosely on the first support assembly element. The ends of the strip portions are pivotably mounted to the base element and the squab portion respectively.

11 Claims, 1 Drawing Sheet

SUPPORT STRUCTURE FOR A SEAT

BACKGROUND OF THE INVENTION

A typical form of support structure for a seat such as more particularly a vehicle seat comprises a scissor support assembly which is arranged on a base member which for example can be fixed to a floor such as a vehicle floor and which in turn supports a seat squab portion which is adapted to be movable vertically by a scissor movement of the support assembly. The support assembly thus provides a scissor axis and it is sprung by means of a spring device to provide for suitable springing of the seat squab portion. The term scissor support assembly means support legs which are disposed in mutually crossing relationship and which permit deflection of the seat squab portion by a scissor-like movement of the legs.

Support structures of the above-indicated nature generally comprise a support structure having two laterally spaced-apart scissor configurations, namely each one being a pair of crossed legs, with the two scissor configurations being pivotably connected together by a suitable form of axis means such as a shaft or spindle. Such an assembly therefore comprises the two scissor configurations and the member connecting same so that such assemblies consist of a number of individual components. That not only means that production of such a support structure is relatively expensive but it also involves an assembly operation which can be highly cost-intensive and time-intensive. All those factors have a detrimental effect on the production costs of such a support structure. Furthermore, the scissor support assemblies of that kind are usually equipped with rollers which are movable along associated linear guides. As will be readily appreciated, that not only has a detrimental effect in terms of the complexity of such a support structure for a seat but it also has an adverse effect in particular on the minima height of such an arrangement.

SUMMARY OF THE INVENTION

An object of the present invention is to provide a support structure for a seat comprising a scissor support assembly of a relatively simple configuration and of comparatively small minimum height.

Another object of the present invention is to provide a support structure for a seat which is simple to manufacture and handle and thus convenient to assemble.

Still another object of the present invention is to provide a support structure for a seat which is of a generally simple mechanical construction involving few complicated or wearing parts.

Yet another object of the invention is to provide a seat incorporating a support structure of a simple and reliable configuration.

In accordance with the present invention the foregoing and other objects are achieved by a support structure for a seat, for example and more particularly a vehicle seat, comprising a scissor support assembly which is disposed on a base means and which is suitably sprung by a spring means, to provide for mounting a seat squab portion. The scissor support assembly has first and second support assembly elements which are not positively connected to each other but which merely bear against each other, thereby defining an axis of pivotal scissor movement of the support assembly. The first support assembly element is connected by an edge portion thereof to the base means and is pivotable about a first pivot axis while the second support assembly element comprises first and second laterally spaced-apart limb portions between which the first support assembly element is disposed and which are each connected by a respective one of their end portions to the base means pivotably about a second pivot axis which is at least substantially parallel to said first pivot axis. The second support assembly element further includes a connecting portion which interconnects the limb portions thereof and which bears loosely on the first support assembly element, thereby defining the axis of pivotal scissor movement. The spring means is connected to one of the support assembly elements, for springing of the seat with which the support structure is used.

As will be seen by a reference to a preferred embodiment described hereinafter, by virtue of the fact that the first and second support assembly elements are independent of or separate from each other, it is possible for the two mutually separate support assembly elements to be arranged on the base means of the support structure according to the invention for a seat, in a very simple fashion and without involving a great deal of force or a great deal of tim, and that has an advantageous effect in terms of the production cost of the support structure and consequently the overall production cost of the seat to which the support structure is fitted. A further advantage is that the support structure according to the invention can be collapsed down to a relatively mall overall height because there are for example no roller-guide assemblies which constitute a limitation in regard to the downward movement of the seat squab portion.

In accordance with a preferred feature the first support assembly element is in the form of a flat or frame-like element having an edge portion with at least one projection projecting away therefrom and being adapted to be inserted into an associated opening or hole in the base means, thereby to provide said first pivot axis. That structure is very simple and mechanically stable. Furthermore, such a configuration for the support structure according to the invention means that the first pivot axis at which the first support assembly element is pivotable relative to the base means is formed simply by insertion of the at least one projection on the first support assembly element into the associated hole or opening in the base means, which is an easy operation that saves time in terms of assembly.

In accordance with another preferred feature, the limb portions of the second support assembly element are in the form of strip portions which are connected together in a common plane by means of the connecting portion, wherein at least one projection extends away from each of the two strip portions at an edge portion thereof. The at least one projection on each strip portion is adapted to be inserted into an associated opening or hole in the base means, thereby to provide said second pivot axis. Such projections and the associated openings or holes in the base means can be produced very easily so that the structure according to the invention is a simple and inexpensive one, in comparison with previous support structures in which the scissor support assembly involves the use of rollers and linear guides. Preferably, the connecting portion has a friction-reducing and wear-resistant or abrasion-resistant element thereon, for example a bar portion, in order to minimise the friction in the support structure according to the invention between the two support assembly elements, that is to say friction as between the first support assembly element and the connecting portion, which bears thereagainst, of the second support assembly element.

A further preferred feature of the invention provides that the limb portions of the second support assembly element are provided at their free end portion which is remote from the second pivot axis, with projections for fixing the seat squab portion of the seat. That simplifies fitting of the squab portion to the support structure according to the invention.

For the same purpose, in accordance with a preferred feature, the first support assembly element way be provided at its free end portion which is remote from the first pivot axis with a support or contact means for loosely movably mounting the squab portion of the seat. Such a support structure can be combined with a suitable seat squab portion in a simple operation which takes up little time so that the support structure according to the invention is advantageously suited for different seats.

In a preferred feature of the support structure of the invention, the spring means engages the free end portion of the first support assembly element but it will be appreciated that it is also possible for the spring means to be operatively connected to any other appropriate location of the support assembly of the support structure of the invention.

Further objects, features and advantages will be apparent from the following description of a preferred embodiment of the invention.

DESCRIPTION OF THE PREFERRED EMBODIMENT

Figures 1, 2:
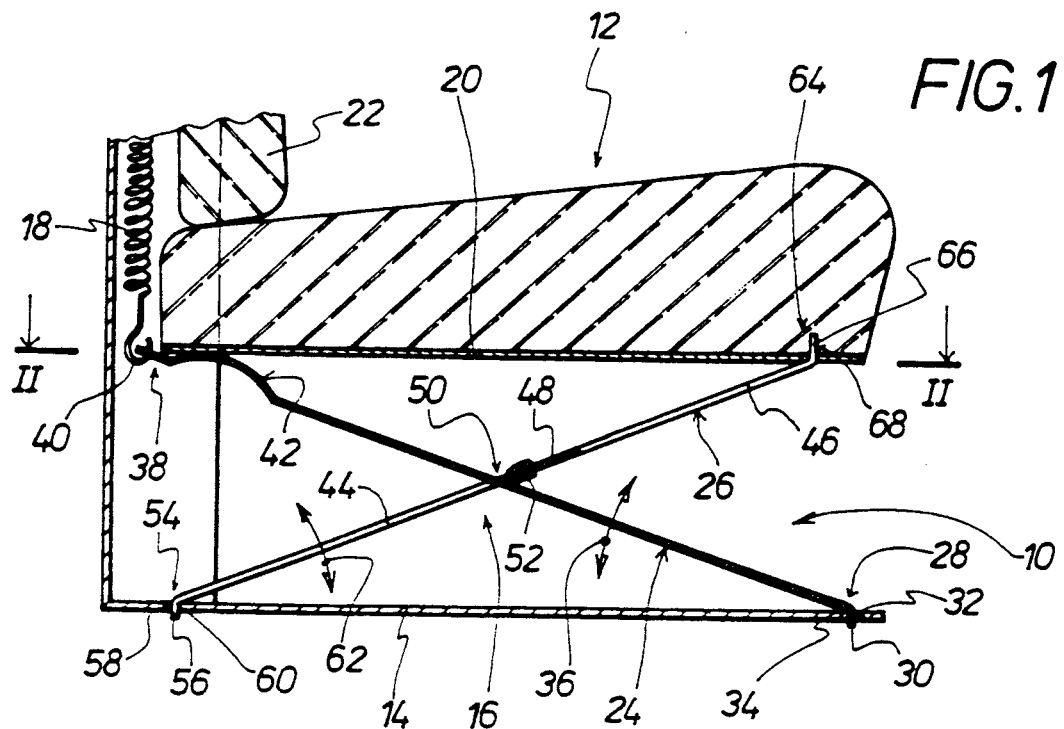
FIG. 1 is a sectional view of a support structure according to the invention, showing just part of the base means and the spring means.
FIG. 2 is a view of the support structure shown in FIG. 1 taken along section line II—II which extends beneath the seat squab portion, so that the seat squab portion is not shown in FIG. 2.

Reference will now be made generally to FIGS. 1 and 2 which are diagrammatic views of a support structure as indicated generally at 10 for a seat 12 such as a vehicle seat. The support structure 10 comprises a base means 14 which can be mounted for example to a floor such as a vehicle floor, a scissor support assembly 16 which is disposed on the base means 14, and a spring means 18 which is operatively connected to a suitable part of the scissor support assembly 16 and to the base means 14 of the support structure 10. The spring means 18 provides for springing of the seat with which the support structure 10 is used.

The seat 12 comprises a seat squab portion 20 and a backrest portion 22 of which only part is indicated in FIG. 1.

The scissor support assembly 16 comprises first and second support assembly elements 24 and 26 which are independent of or separate from each other. The first element 24 is shown as being for example in the form of a surface or solid element, but it will be appreciated that it would also be possible for the first element 24 to be in the form of a frame-like element, for example with suitable openings cut out therein, in order to produce a reduction in the weight of the support structure 10.

At its one edge or end portion 28, the first element 24 has at least one projection or lug 30 which projects into a hole or opening 32 in the base means 14. That defines a first pivot axis as indicated at 34, about which the first element 24 is pivotable, as indicated by the arcuate arrow 36 in FIG. 1.

The spring means 18 is connected by a connecting portion 40 to the second end or edge portion 38 of the first element 24, which is remote from the first portion 28 thereof.

In the vicinity of its second end or edge portion 38, the first element 24 has a support or contact configuration 42 on which the squab portion 20 of the seat 12 is loosely supported.

As can be seen more clearly from FIG. 2, the second element 26 comprises first and second laterally spaced-apart limb portions 44, between which is disposed the first support assembly element 24, in the form of a full or solid element 46 of a generally plate-like configuration. The two limb portions 44 are mechanically firmly connected together by means of a connecting portion 48. As shown in FIG. 1, the two elements 24 and 26 are disposed on the base means 14 in such a way that they are in mutually crossing relationship, with the connecting portion 48 bearing on the first element 24 and defining a pivotal scissor movement axis 50 for the scissor support assembly 16. So that the springing mobility of the scissor support assembly 16, that is to say the movement of the elements 24 and 26 relative to each other, is not adversely affected by undesirable friction, it is advantageous for the connecting portion 48 to be provided with a friction-reducing, wear-resistant or abrasion-resistant element such as a bar or strip portion 52 carried thereon. As can be clearly seen from FIG. 1, the strip portion 52 is of a generally U-shaped configuration in cross-section and thus embraces the connecting portion 48 to be retained thereon.

Each limb portion 44 of the second element 26 is provided with at least one lug or projection 56 at its one end or edge portion 54. The lugs or projections 56 are inserted into associated holes or openings 58 in the base means 14. The co-operation of the lugs or projections 56 and the holes or openings 58 defines a second pivot axis as identified at 60 which is disposed at a spacing from and at least substantially parallel to the first pivot axis 34 between the first element 24 and the base means 14. The second element 26 is pivotable about the second axis 60, as indicated by the arcuate arrow 62 in FIG. 1.

The second end or edge portion 64 of each of the limb portions 44 of the second element 26 is provided with at least one upstanding lug or projection 66, as can be clearly seen from FIG. 1, which can be inserted or engaged into suitable openings 68 in the squab portion 20, for mounting the squab portion 20 of the seat 12 to the support structure.

It will be seen therefore that in the support structure according to the invention, the scissor support assembly does not comprise two lateral scissor configurations which are connected together by means of a shaft or spindle, as in previous designs, but it comprises two mutually independent separate support assembly elements which can be handled more easily than the previous constructions.

It will be appreciated that the above-described embodiment has been set forth solely by way of example and illustration of the principles of the present invention and that various modifications and alterations way be made therein without thereby departing from the spirit and scope of the present invention.

Thus for example, in a simple configuration of the support structure for a seat, it is even possible to omit the second support assembly element and to suitably mount the seat squab portion simply on the first support assembly element.

What is claimed is:

1. A support structure for a squab portion of a seat including: a base means; a scissor support assembly on the base means and comprising first and second support assembly elements which are not connected to each other but which only bear against each other and of which the first scissor support assembly is connected by an edge portion thereof to the base means pivotably about a first pivot axis and the second support assembly element has first and second spaced-apart limb portions between which the first support assembly element is disposed and which are each connected by a respective one of their edge portions to the base means pivotably about a second pivot axis which is at least substantially parallel to said first pivot axis, the second support assembly element further including a connecting portion which interconnects said limb portions and which bears loosely on said first support assembly element, thereby defining an axis of pivotal scissor movement of said support assembly; and a spring means connected to a said support assembly element, for springing of said seat.

2. A structure as set forth in claim 1 wherein said spring means is connected to said first support assembly element.

3. A structure as set forth in claim 1 wherein said first support assembly element is in the form of a solid element having an edge portion with at least one projection means projecting away from said edge portion thereof, and wherein the base means has an opening for receiving the said projection means, to provide said first pivot axis.

4. A structure as set forth in claim 1 wherein the first support assembly element is in the form of a frame-like element having an edge portion with at least one projection means projecting away from said edge portion thereof, and wherein the base means has an opening for receiving the said projection mans, to provide said first pivot axis.

5. A structure as set forth in claim 1 wherein the limb portions of the second support assembly element are in the form of strip portions connected together by means of the connecting portion extending in a common plane, wherein at least one projection means extends away from each of the strip portions at its one edge portion, and wherein said base means has an opening for receiving said projection means, thereby to provide said second pivot axis.

6. A structure as set forth in claim 1 wherein said connecting element has a friction-reducing wear-resistant element thereon.

7. A structure as set forth in claim 6 wherein said friction-reducing element is a strip portion.

8. A structure as set forth in claim 1 wherein the limb portions of the second support assembly element are provided at their free edge portion which is remote from the second pivot axis with projection means for fixing a squab portion of a said seat.

9. A structure as set forth in claim 1 wherein at its free edge portion which is remote from said first pivot axis said first support assembly element has contact means for loosely movably mounting a squab portion of a said seat.

10. A structure as set forth in claim 1 wherein said spring means operatively engages a free edge portion of said first support assembly element, which is remote from said first pivot axis.

11. In a seat including a squab portion, a support structure for the squab portion, including: a base means; a scissor support assembly on the base means and comprising first and second support assembly elements which are not positively connected to each other but which only bear against each other, one of the support assembly elements having an end portion connected to one of the base means and the squab portion pivotably about a first pivot axis, and the other support assembly element comprising first and second spaced-apart limb portions between which the first support assembly element is disposed, end parts of said limb portions at the same end of said other support assembly element being connected to one of said base means and said squab portion pivotably about a second pivot axis which is at least substantially parallel to said first pivot axis, the other support assembly element further including a connecting portion which interconnects said limb portions and which bears loosely on said first support assembly element, thereby defining an axis of pivotal scissor movement of said support assembly; and a spring means connected to a said support assembly element, for springing of said squab portion relative to said base means.

* * * * *